US012497815B2

(12) United States Patent
Lee et al.

(10) Patent No.: US 12,497,815 B2
(45) Date of Patent: Dec. 16, 2025

(54) DOOR OPEN-CLOSE DEVICE FOR VEHICLE

(71) Applicants: Hyundai Motor Company, Seoul (KR); Kia Corporation, Seoul (KR); PHA CO., LTD., Daegu (KR)

(72) Inventors: Jaeseung Lee, Hwaseong-si (KR); Gookhyun Jeon, Hwaseong-si (KR); Seong Tae Hong, Daegu (KR); Moon Gyu Choi, Daegu (KR)

(73) Assignees: Hyundai Motor Company, Seoul (KR); Kia Corporation, Seoul (KR); PHA CO., LTD., Daegu (KR)

( * ) Notice: Subject to any disclaimer, the term of this patent is extended or adjusted under 35 U.S.C. 154(b) by 0 days.

(21) Appl. No.: 18/913,631

(22) Filed: Oct. 11, 2024

(65) Prior Publication Data

US 2025/0230695 A1 Jul. 17, 2025

(30) Foreign Application Priority Data

Jan. 16, 2024 (KR) ........................ 10-2024-0006590

(51) Int. Cl.
*E05F 15/646* (2015.01)
*E05D 15/10* (2006.01)
(Continued)

(52) U.S. Cl.
CPC ........ *E05F 15/646* (2015.01); *E05D 15/1081* (2013.01); *E05F 15/638* (2015.01); *E05F 15/655* (2015.01); *E05D 2015/1071* (2013.01); *E05D 2015/1097* (2013.01); *E05Y 2201/412* (2013.01); *E05Y 2201/426* (2013.01);
(Continued)

(58) Field of Classification Search
CPC ............... E05F 15/646; E05D 15/1071; E05D 2015/1081; E05D 2015/1097
See application file for complete search history.

(56) References Cited

U.S. PATENT DOCUMENTS 3,386,204 A * 6/1968 Obata ................. E05D 15/1068 49/212
4,135,760 A * 1/1979 Grossbach .......... E05D 15/1081 296/155
(Continued)

FOREIGN PATENT DOCUMENTS

DE 102017001338 A1 * 8/2018 ......... E05D 15/1081
DE 102024132087 A1 * 7/2025 ............ E05F 15/643
(Continued)

*Primary Examiner* — Catherine A Kelly
(74) *Attorney, Agent, or Firm* — Morgan Lewis & Bockius LLP

(57) ABSTRACT

A door open-close device for a vehicle configured to open or close a door opening portion by sliding and moving and popping up a door formed in a vehicle body includes a driving unit configured to provide a driving force for sliding and pop-up operations of the door; a latch assembly configured to receive the driving force from the driving unit and cause the door to pop up; a pulley-belt unit engaged to the driving unit and configured to receive the driving force from the driving unit and allow the door to slide and move; and a rail unit connected to the door and configured to provide a path for the door to slide and move by operation of the pulley-belt unit.

19 Claims, 21 Drawing Sheets

(51) Int. Cl.
*E05F 15/638* (2015.01)
*E05F 15/655* (2015.01)

(52) U.S. Cl.
CPC ... *E05Y 2201/652* (2013.01); *E05Y 2201/668* (2013.01); *E05Y 2201/716* (2013.01); *E05Y 2201/722* (2013.01); *E05Y 2900/531* (2013.01)

(56) References Cited

U.S. PATENT DOCUMENTS

| | | | | | |
|---|---|---|---|---|---|
| 5,893,236 | A * | 4/1999 | Krbec | E05F 15/652<br>49/210 |
| 6,684,567 | B2 * | 2/2004 | Heidrich | B61D 19/008<br>49/213 |
| 9,752,366 | B2 * | 9/2017 | Pellegrini | E05F 15/00 |
| 9,931,913 | B2 * | 4/2018 | Prevost | E05F 15/646 |
| 10,458,166 | B2 * | 10/2019 | Yamaguchi | E05F 5/003 |
| 10,889,307 | B2 * | 1/2021 | Sakaki | B61D 19/003 |
| 11,933,093 | B2 * | 3/2024 | Heidrich | E05D 15/1044 |
| 2025/0230695 | A1 * | 7/2025 | Lee | E05F 15/638 |

FOREIGN PATENT DOCUMENTS

| | | | | |
|---|---|---|---|---|
| EP | 0940278 A2 * | 9/1999 | | B60J 5/12 |
| EP | 2184431 A1 * | 5/2010 | | E05F 15/565 |
| FR | 2880842 A1 * | 7/2006 | | E05D 15/1047 |
| FR | 2890003 A1 * | 3/2007 | | E05D 15/1081 |
| FR | 2891497 A1 * | 4/2007 | | E05D 15/1081 |
| GB | 2403265 A * | 12/2004 | | E05F 15/565 |
| KR | 20250111894 A * | 7/2025 | | E05F 15/649 |
| KR | 20250112339 A * | 7/2025 | | E05F 15/652 |
| WO | WO-2019215353 A1 * | 11/2019 | | E05C 19/14 |

* cited by examiner

100

100

100

DOOR OPEN-CLOSE DEVICE FOR VEHICLE

CROSS-REFERENCE TO RELATED APPLICATION

The present application claims priority to Korean Patent Application No. 10-2024-0006590 filed on Jan. 16, 2024, the entire contents of which is incorporated herein for all purposes by this reference.

BACKGROUND OF THE PRESENT DISCLOSURE

Field of the Present Disclosure

The present disclosure relates to a door open-close device for a vehicle, and more particularly, to a bi-directional door open-close device for a vehicle configured to open or close a door opening portion of a vehicle body by sliding and popping up a door of the vehicle in both front and rear directions, in the vehicle without a B-pillar.

Description of Related Art

In general, doors for a vehicle are doors that separate the interior and exterior of the vehicle, and serve an important function of protecting passengers safely by blocking external noise, rain, dust, and wind, etc and absorbing an impact along with a side structure in case of a side collision.

There are various types of doors for the vehicle, including doors for special purposes, but hinged swing doors are most often applied to passenger vehicles.

Usually, a swing door refers to a door that opens to the outside of a vehicle body around a hinge shaft provided through a hinge bracket between the vehicle body and the swing door, and has the advantage of being easy to open or close, and easy to maintain and repair due to a simple structure.

On the other hand, a counter-swing door that has a high sense of openness when a door is opened, and is advantageous for passengers to get on or off is applied to some vehicles. The counter-swing door is opened or closed by use of the rotation of an arm connected to the vehicle body and the door.

However, the counter swing door has the advantage of having a large amount of door opening and closing, but there is a problem of an excessive amount of protrusion to the outside of the vehicle when the door is opened due to a length of the arm. Furthermore, as shown in FIG. 1 and FIG. 2, in a 3-point sliding door/rail structure in which an upper rail U, a center rail C, and a lower rail L are applied to a vehicle body 1, a door opening amount b is limited according to a length a of the center rail C. Considering the design such as a lamp position of a vehicle and short overhang, it is difficult to increase the door opening amount b when the center rail C exists. Therefore, there is a problem that a design and a degree of freedom of package of the vehicle are limited.

Therefore, as shown in the vehicle body 1 having a door 2 in FIG. 3 and FIG. 4, it is necessary to maximize a door opening amount c by not applying a center rail at a position 'A'.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a door open-close device for a vehicle configured for removing a center rail/door arm structure from a counter sliding door structure of a vehicle without a B-pillar and implementing sliding and pop-up operations of a door by an upper rail/door arm structure, and thus, a door opening width is maximized without design and package constraints and simultaneously a door rotation radius is minimized, minimizing an amount of protrusion toward the outside of a vehicle body of the door when the door is opened.

According to an exemplary embodiment of the present disclosure, a door open-close device for a vehicle configured to open or close a door opening portion by sliding and moving and popping up a door formed in a vehicle body includes a driving unit configured to provide a driving force for sliding and pop-up operations of the door, a latch assembly configured to receive the driving force from the driving unit and cause the door to pop up, a pulley-belt unit engaged to the driving unit and configured to receive the driving force from the driving unit and allow the door to slide and move, and a rail unit connected to the door and configured to provide a path for the door to slide and move by operation of the pulley-belt unit.

The driving unit may include a driving motor, and a motor shaft provided at a center of the driving motor, engaged to the pulley-belt unit, and rotating by a rotation force of the driving motor.

The latch assembly may include a latch unit provided at a lower portion of the rail unit, configured to move in a longitudinal direction of the rail unit, and cause the door to slide and move or pop up, and a pop-up unit provided at the lower portion of the rail unit, and configured to cause the door to pop up or be released from the pop-up according to an operation of the latch unit.

The latch unit may include latches configured to rotate to be coupled to or decoupled from latch locks provided in a belt carrier moving linearly along the rail unit by driving of the driving unit at the lower portion of the rail unit to switch pop-up and sliding operations of the door.

The latches may include a latch fixing unit provided to move linearly at the lower portion of the rail unit, a first latch provided in the latch fixing unit and configured to rotate to be directly coupled to or decoupled from the latch locks provided in the belt carrier, a second latch pivotally coupled to the latch fixing unit and coupled to the first latch to rotate together or decoupled from the first latch and fixed, and a latch connection unit coupling the first latch to the second latch.

The pop-up unit may include guide bars connected to lower portions of first and second sides of the rail unit and configured to guide a pop-up path of the door, fixing brackets fixed to the vehicle body and into which the guide bars are inserted, a bracket connection bar connecting the fixing brackets to each other, a first pop-up arm including a first end portion rotatably connected to the latch fixing unit, and a second end portion rotatably connected to the bracket connection bar, and a second pop-up arm including a first end portion fixed on the lower portion of the rail unit, a second end portion rotatably connected to the bracket connection bar, and rotatably connected to the first pop-up arm to have a cross shape at a center portion.

The rail unit may include a first rail connected to the driving unit, a second rail connected to the first rail and configured to slide and move along the first rail, and a third rail connected to the second rail and configured to slide and move along the second rail.

The second rail may slide and move in a longitudinal direction of the first rail by rolling of roller bearings provided on the second rail, and the third rail may slide and move in a longitudinal direction of the second rail by rolling of the roller bearings provided on the third rail.

The pulley-belt unit may include pulleys provided on a lower portion of the first rail and configured to receive a driving force from the driving unit and rotate, and a belt coupled to the pulleys and configured to move linearly by rotation of the pulleys.

The pulleys may include a first pulley connected to the motor shaft and connected to rotate at the lower portion of the first rail and a second pulley connected to rotate on an opposite side to the lower portion of the first rail spaced apart from the first pulley.

The belt carrier may include a first pinion gear engaged with a first rack gear extending in a longitudinal direction and formed on a lower surface of the first rail and configured to move.

The belt carrier may be connected to a lower portion of the second rail by a coupling pin.

The pulley may include a third pulley provided at the lower portion of the second rail and connected to the first pinion gear, and a fourth pulley connected to rotate on an opposite side of the lower portion of the second rail spaced apart from the third pulley.

The third pulley and the fourth pulley may be connected to a belt configured to move linearly by rotation of the third pulley and the fourth pulley.

The fourth pulley may include a second pinion gear engaged with a second rack gear extending and formed in a longitudinal direction of the third rail, and configured to rotate to move the third rail in the longitudinal direction when the fourth pulley rotates.

According to an exemplary embodiment of the present disclosure, a center rail/door arm structure is removed from a counter sliding door structure of a vehicle without a B-pillar, and thus, a door opening width may be maximized.

Furthermore, an upper rail/door arm structure in which sliding and pop-up operations of a door are implemented is introduced, and thus, a door rotation radius is minimized, minimizing an amount of protrusion toward the outside of a vehicle body of the door when the door is opened.

Furthermore, a rail unit with a 3-stage telescopic structure is applied, and thus, openness and robustness may be simultaneously secured.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
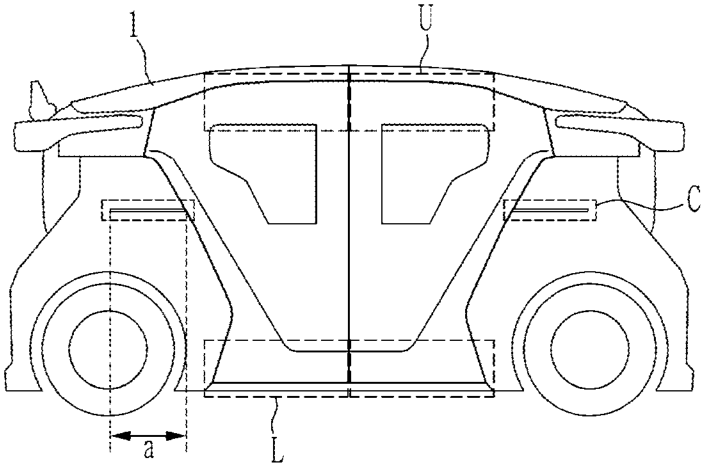
FIG. 1 is a diagram schematically showing a vehicle with a bi-directional swing door of the related art.
Figure 2:
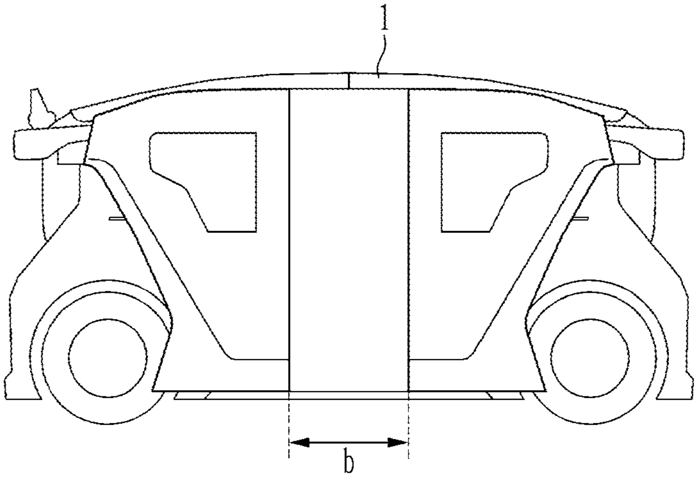
FIG. 2 is a diagram illustrating a state in which a door opening amount is limited in the vehicle with the bi-directional swing door of the related art.
Figure 3:
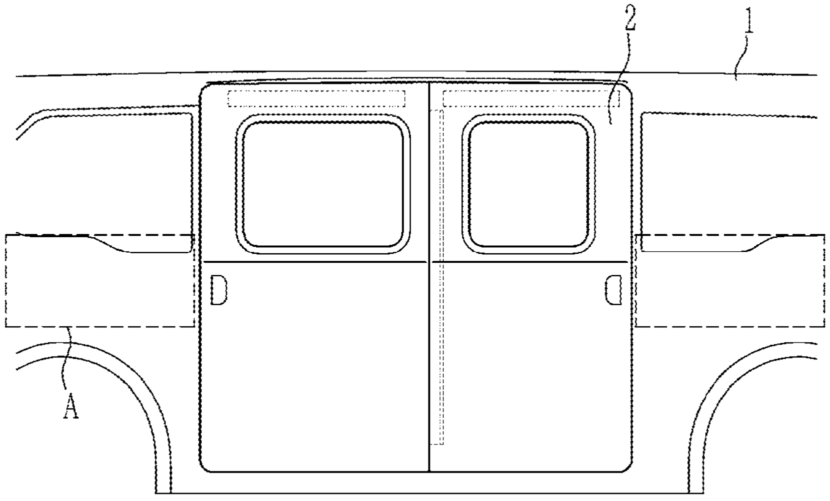
FIG. 3 is a diagram illustrating a state in which a center rail is not applied in the vehicle with the bi-directional swing door of the related art.
Figure 4:
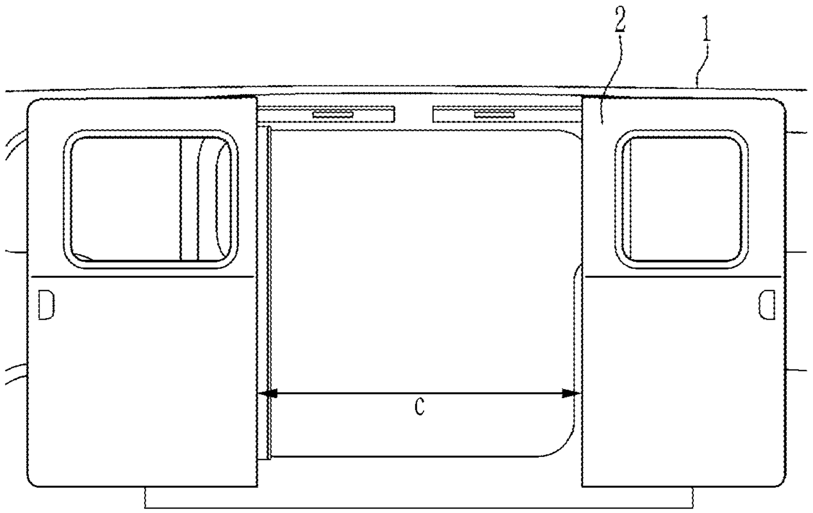
FIG. 4 is a diagram showing a state in which the door opening amount is maximized by not applying a center rail in the vehicle with the bi-directional swing door of the related art.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The present disclosure will be described more fully hereinafter with reference to the accompanying drawings, so that those skilled in the art to which the present disclosure pertains may easily implement the exemplary embodiments of the present disclosure. However, the present disclosure may be implemented in various forms and is not limited to the exemplary embodiments described herein.

Furthermore, in various exemplary embodiments of the present disclosure, elements including the same configuration are typically described in an exemplary embodiment of the present disclosure by use of the same reference numerals, and in other exemplary embodiments of the present disclosure, only configurations different from an exemplary embodiment will be described.

Please be informed that the drawings are schematic and not drawn to scale. Relative dimensions and ratios of portions in the drawings are shown exaggerated or reduced in size for clarity and convenience in the drawings, and any dimensions are illustrative only and not limiting. Furthermore, the same reference numerals are used to denote similar features in the same structure, element or portions appearing in two or more drawings. When an element is referred to as being "on" another element, it may be directly on the other element or intervening elements may also be accompanied.

The exemplary embodiment of the present disclosure represents an exemplary embodiment of the present disclosure. As a result, various modifications of diagrams are expected. Therefore, the exemplary embodiment of the present disclosure is not limited to a predetermined shape of an area shown, and includes, for example, a modification of the shape by manufacturing.

Hereinafter, a door open-close device for a vehicle according to an exemplary embodiment of the present disclosure will be described in detail with reference to the accompanying drawings.

Figure 5:
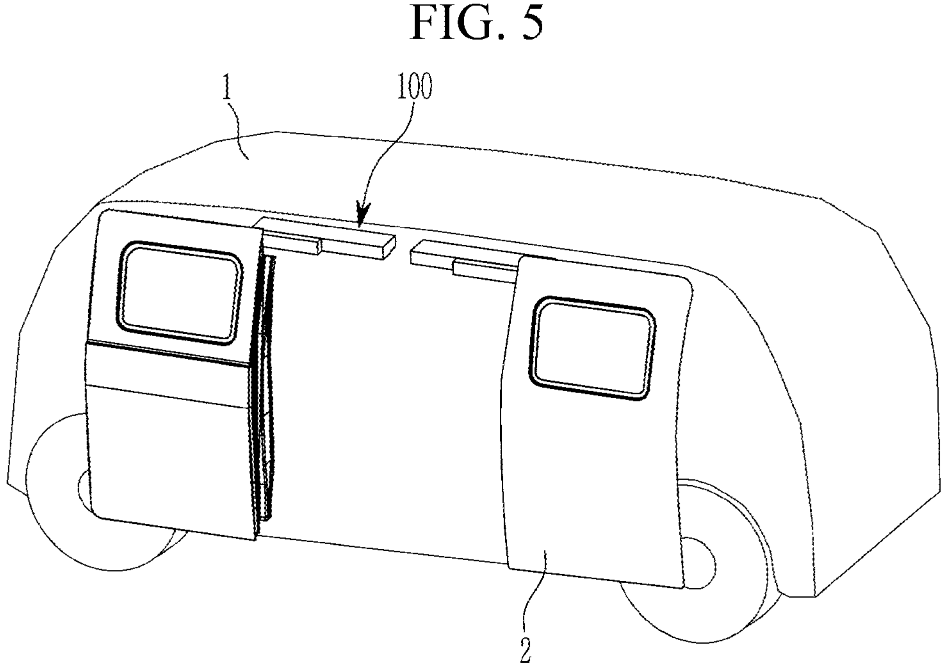
FIG. 5 is a diagram showing a state in which a door open-close device for a vehicle according to an exemplary embodiment of the present disclosure is provided in the vehicle.
Figure 6:
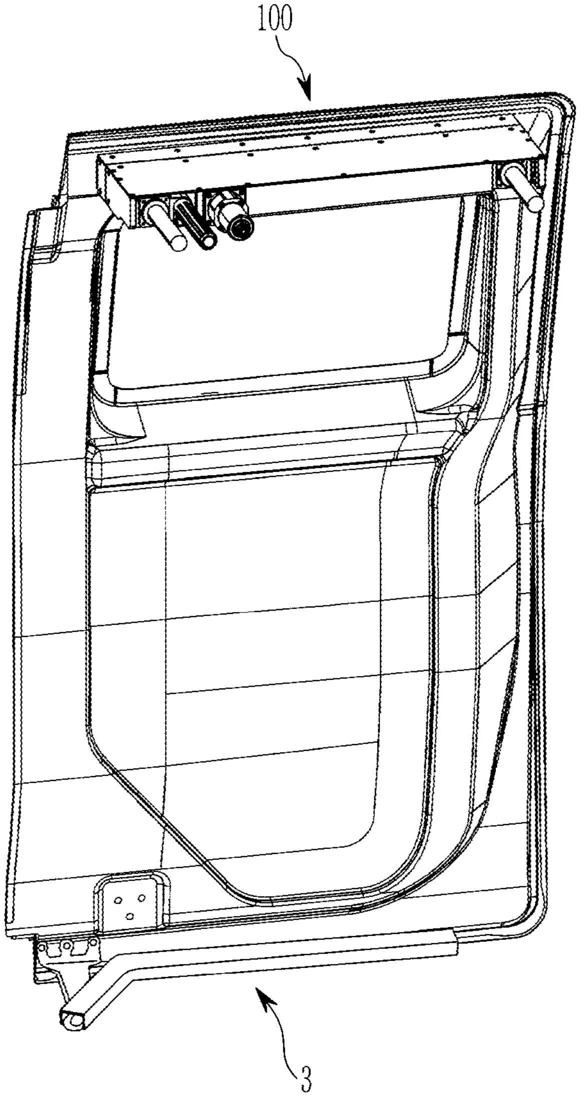
FIG. 6 is a diagram showing a state in which a door open-close device for a vehicle according to an exemplary embodiment of the present disclosure is provided on a door of the vehicle.
Figure 7:
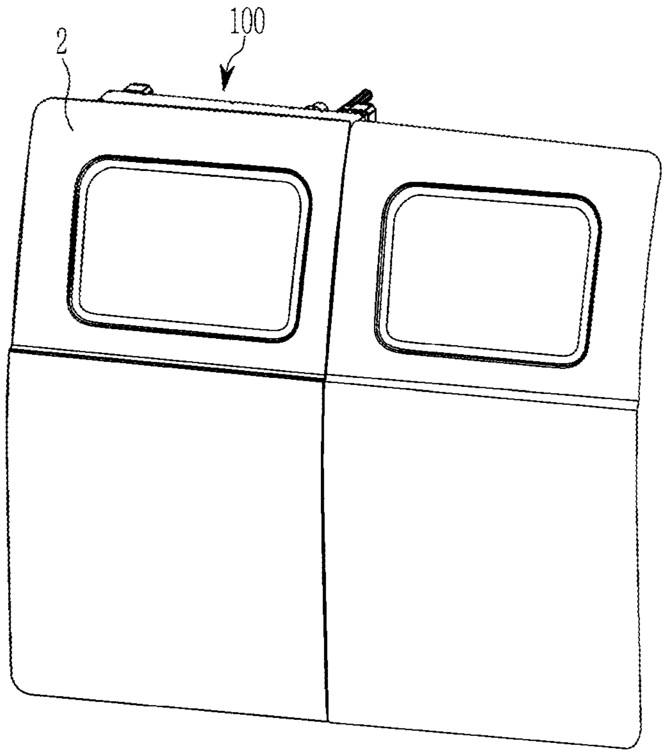
FIG. 7 is a diagram illustrating a closed state of a door of a vehicle to which a door open-close device for the vehicle according to an exemplary embodiment of the present disclosure is applied.
Figure 8:
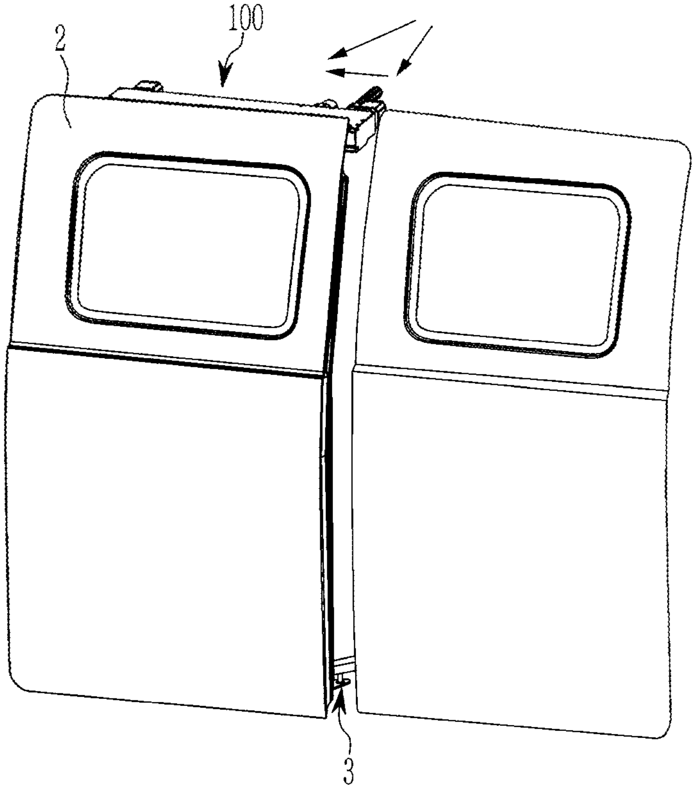
FIG. 8 is a diagram illustrating a pop-up and sliding state of a door of a vehicle to which a door open-close device for the vehicle according to an exemplary embodiment of the present disclosure is applied.
Figure 9:
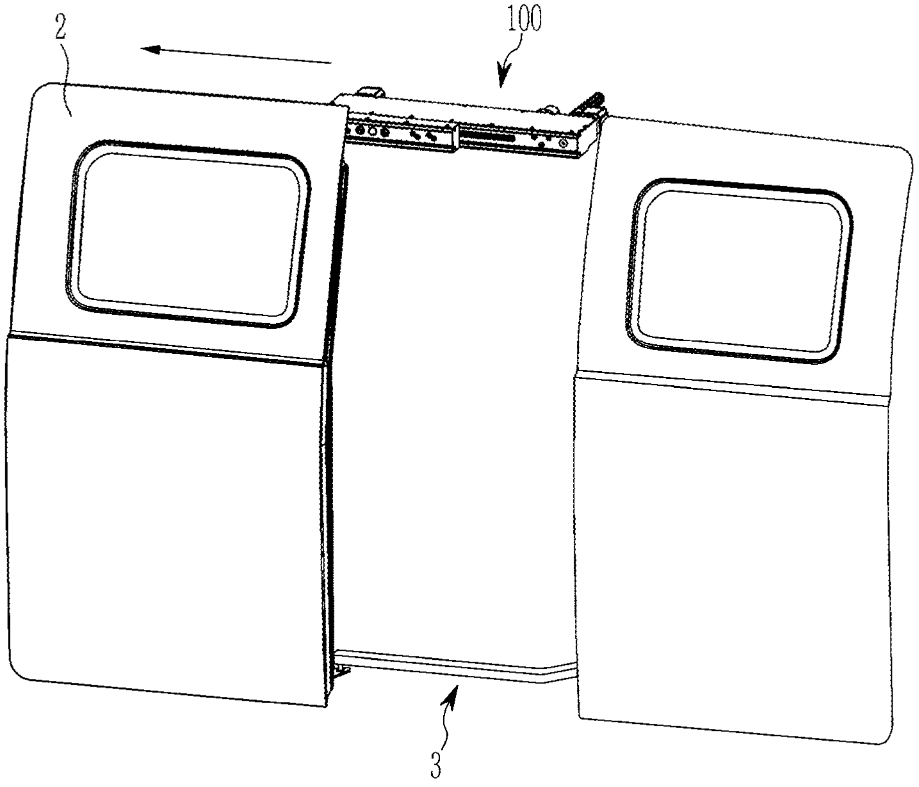
FIG. 9 is a diagram illustrating an opening completion state of a door of a vehicle to which a door open-close device for the vehicle according to an exemplary embodiment of the present disclosure is applied.

FIG. 5 is a diagram showing a state in which a door open-close device for a vehicle according to an exemplary embodiment of the present disclosure is provided in a vehicle. FIG. 6 is a diagram showing a state in which the door open-close device for the vehicle according to an exemplary embodiment of the present disclosure is provided on a door of the vehicle. FIG. 7 is a diagram illustrating a closed state of a door of the vehicle to which the door open-close device for the vehicle according to an exemplary embodiment of the present disclosure is applied. FIG. 8 is a diagram illustrating a pop-up and sliding state of the door of the vehicle to which the door open-close device for the vehicle according to an exemplary embodiment of the present disclosure is applied. FIG. 9 is a diagram illustrating an opening completion state of the door of the vehicle to which the door open-close device for the vehicle according to an exemplary embodiment of the present disclosure is applied.

Referring to FIG. 5 and FIG. 6, a door open-close devices 100 for a vehicle according to an exemplary embodiment of the present disclosure are to open or close a door opening portion by sliding and popping up doors 2 formed on a vehicle body 1 and are provided in an upper portion of the door opening portion of the vehicle body 1.

The door open-close devices 100 may be provided in a pair to face each other on the upper portion of the door opening portion corresponding to the front and rear doors 2, respectively.

The door open-close devices 100 may be provided to connect the outside of the vehicle body 1 and the inside of the door 2, an outermost rail 34 of a rail unit may be attached to the door 2, and fixing brackets 6 and 9 may be attached to the vehicle body 1.

Furthermore, a lower module 3 including a lower rail and a lower arm may be provided in a lower portion of the door opening portion of the vehicle body 1. The lower module 3 may support the door 2 to pop up and slide and move in accordance with vertical balance depending on an operation of the door open-close device 100 for the vehicle according to an exemplary embodiment of the present disclosure.

As shown in FIGS. 7 to 9, in a state in which the door 2 of the vehicle is closed, a driving unit operates so that the door 2 pops up and slides and moves to the outside of the vehicle body 1.

When pop-up of the door 2 is completed, the pop-up of the door 2 is stopped by the driving unit and a latch assembly, and the door 2 slides and moved in a longitudinal direction of the vehicle body 1. Such operations may be implemented separately over time on the front door 2 and the rear door 2, or may be implemented simultaneously.

Figure 10:
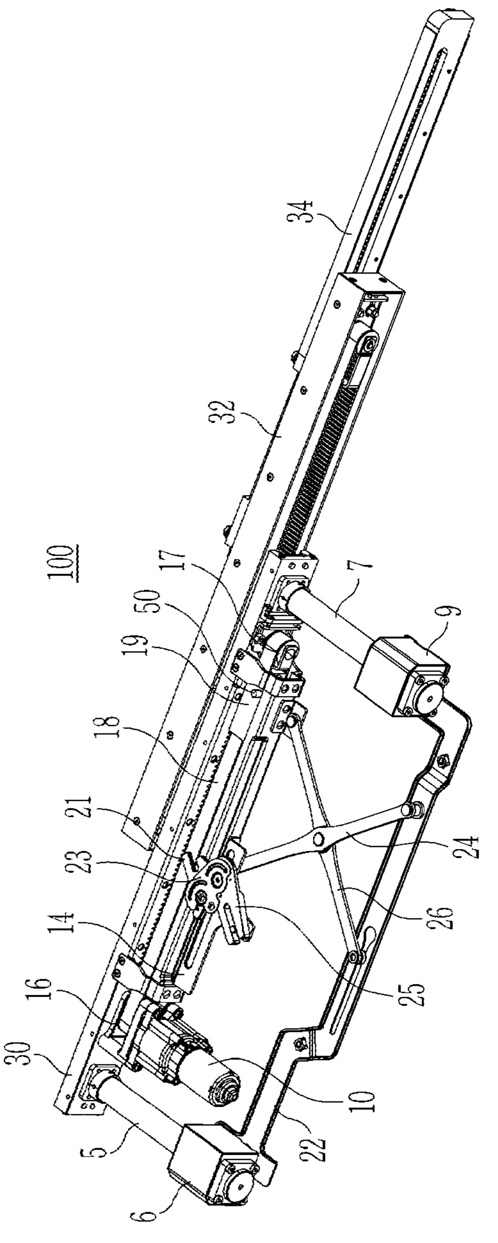
FIG. 10 is a diagram showing a door open-close device for a vehicle according to an exemplary embodiment of the present disclosure.

FIG. 10 is a diagram showing the door open-close device for the vehicle according to an exemplary embodiment of the present disclosure.

Referring to FIG. 10, the door open-close device 100 for the vehicle according to an exemplary embodiment of the present disclosure may include a driving unit, a latch assembly, a pulley-belt unit, and a rail unit.

The driving unit provides a driving force for sliding and pop-up operations of the door 2.

The driving unit may include a driving motor 10 and a motor shaft 12 provided at the center of the driving motor 10 and rotating by a rotation force of the driving motor 10.

The driving motor 10 receives a signal for opening or closing the door 2 and generates the rotation force through the motor shaft 12.

The latch assembly receives the driving force from the driving unit and causes the door 2 to pop up.

The latch assembly includes a latch unit and a pop-up unit. The latch unit is provided at a lower portion of the rail unit, moves in a longitudinal direction of the rail unit, and operates so that the door 2 slides and moves or pops up. Furthermore, the pop-up unit is provided at the lower portion of the rail unit, and causes the door 2 to pop up or be released from the pop-up according to an operation of the latch unit.

The latch unit may include latches 14, 21, 23, and 25 that rotate to be coupled to or decoupled from latch locks 50 provided in a belt carrier 19 to switch pop-up and sliding operations of the door 2.

The belt carrier 19 is coupled to pulleys 16 and 17 of a pulley-belt unit, is provided on a belt 18 that moves linearly by rotations of the pulleys 16 and 17, and moves linearly along the rail unit according to a movement of the belt 18.

The latches 14, 21, 23, and 25 include the latch fixing unit 14 provided to move linearly at the lower portion of the rail unit, the first latch 21 and the second latch 25 provided in the latch fixing unit 14, and the latch connection unit 23.

The pop-up unit includes guide bars 5 and 7 connected to lower portions of both sides of the rail unit, fixing brackets 6 and 9 fixed to the vehicle body 1 and into which the guide bars 5 and 7 are inserted, a bracket connection bar 22 connecting the fixing brackets 6 and 9 to each other in a longitudinal direction of the vehicle body 1, a first pop-up arm 24, and a second pop-up arm 26.

One end portion of the guide bars 5 and 7 may be coupled to a lower surface of the rail unit, and when the pop-up unit of the latch unit operates, moved in a lateral direction of the vehicle body 1 while being inserted into the fixing brackets 6 and 9 fixed to the vehicle body 1.

The bracket connection bar 22 connects the fixing brackets 6 and 9 on both sides, and the other end portions of the first pop-up arm 24 and the second pop-up arm 26 are rotatably connected.

The first pop-up arm 24 has one end portion rotatably connected to the latch fixing unit 14, and the other end portion rotatably connected to the bracket connection bar 22. Also, the second pop-up arm 26 has one end portion fixed on the lower portion of the rail unit, and the other end portion rotatably connected to the bracket connection bar 22.

In an exemplary embodiment of the present disclosure, the first pop-up arm 24 has the one end portion slidably connected to the latch fixing unit 14, and the other end portion pivotally connected to the bracket connection bar 22. Also, the second pop-up arm 26 has the one end portion pivotally on the lower portion of the rail unit, and the other end portion slidably connected to the bracket connection bar 22.

The other end portion of the first pop-up arm 24 and the other end portion of the second pop-up arm 26 are spaced apart by a certain distance, and center portions thereof are rotatably connected to each other and provided in a cross (X) shape. The other end portion of the second pop-up arm 26 slides and moves and is rotatably connected to the bracket connection bar 22. To the present end, an opening having a certain length may be formed in the bracket connection bar 22 at a part to which the other end portion of the second pop-up arm 26 is coupled.

The pulley-belt unit receives a driving force from the driving unit and allows the door 2 to slide and move. The pulley-belt unit includes the pulleys 16 and 17 provided on a lower portion of a first rail 30 and receiving the driving force from the driving unit and rotate, and the belt 18 coupled to the pulleys 16 and 17 and moving linearly by the rotation of the pulleys 16 and 17.

The pulleys 16 and 17 may include the first pulley 16 coaxially connected to the motor shaft 12 and connected to rotate at a lower portion of the first rail 30, and the second pulley 17 connected to rotate on the opposite side to the lower portion of the first rail 30 spaced apart from the first pulley 16. The first pulley 16 and the second pulley 17 may be connected to each other by the belt 18, and the belt 18 may move linearly by rotation of the first pulley 16 and the second pulley 17.

The rail unit is coupled to an internal surface of the door 2, and slides and moves by operation of the pulley-belt unit to cause the door 2 to slide and move.

The rail unit includes a first rail 30 connected to the driving unit, a second rail 32 connected to the first rail 30 and sliding and moving along the first rail 30, and a third rail 34 connected to the second rail 32 and sliding and moving along the second rail 32.

Figure 11:
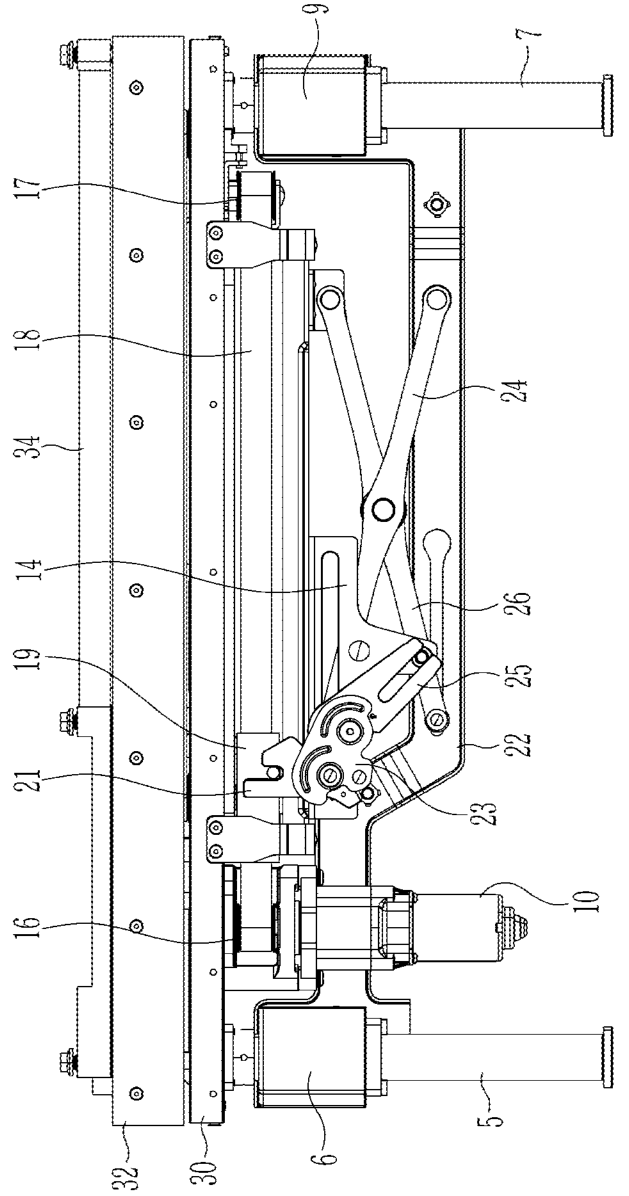
FIG. 11 is a diagram showing a pop-up and sliding operation state of a door open-close device for a vehicle according to an exemplary embodiment of the present disclosure.
Figure 12:
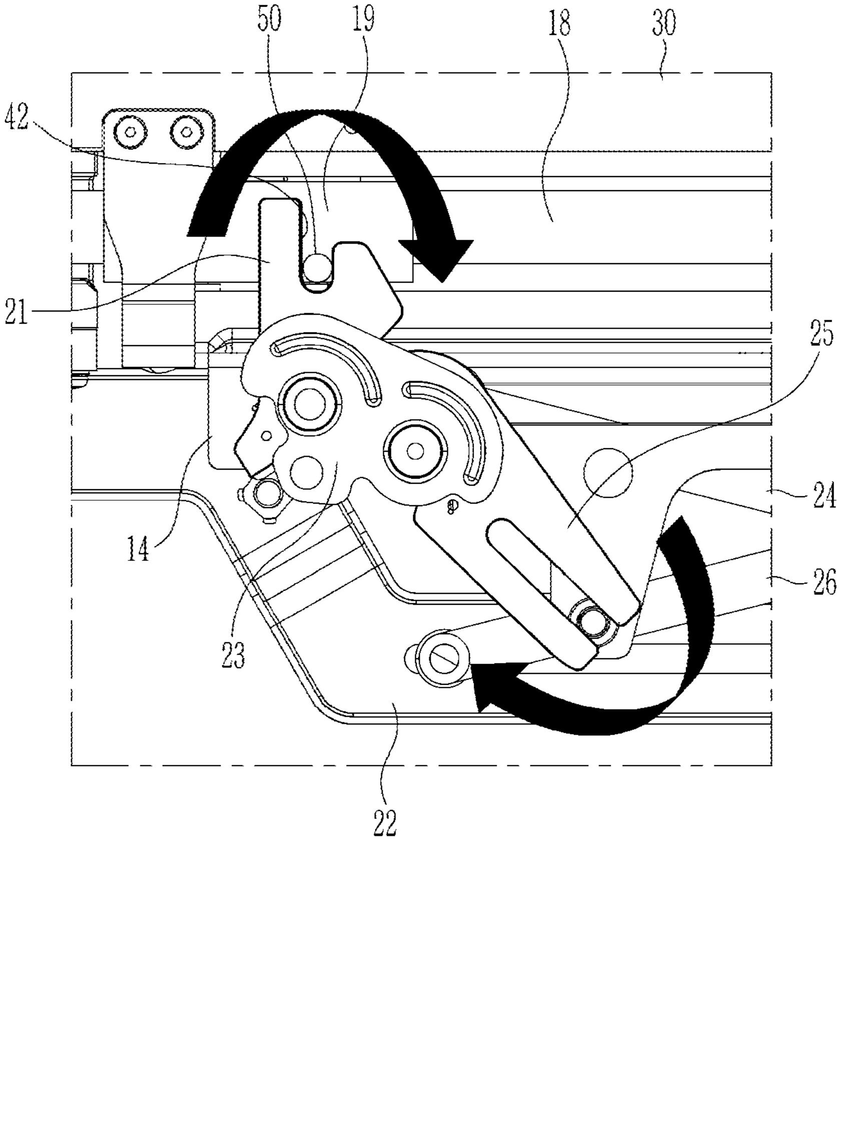
FIG. 12 is a diagram showing an operation state of a latch unit of the door open-close device for the vehicle of FIG. 11.

FIG. 11 is a diagram showing a pop-up and sliding operation state of a door open-close device for a vehicle according to an exemplary embodiment of the present disclosure. FIG. 12 is a diagram showing an operation state of a latch unit of the door open-close device for the vehicle of FIG. 11.

Referring to FIG. 11 and FIG. 12, when an opening signal of the door 2 is applied, a driving force is generated in the driving motor 10, when the motor shaft 12 rotates, the first pulley 16 coaxially connected thereto rotates, and the second pulley 17 connected to the belt 18 also rotates. The belt 18 moves linearly between the first pulley 16 and the second pulley 17.

The belt carrier 19 is provided in the belt 18, and also moves according to a linear movement of the belt 18. A latch lock 50 is formed on the belt carrier 19.

As the belt carrier 19 moves, the latch lock 50 is coupled to the first latch 21, and the first latch 21 rotates. The rotation of the first latch 21 rotates the second latch 25 connected by the latch connection unit 23, and the second latch 25 is coupled to the second pop-up arm 26.

Figure 13:
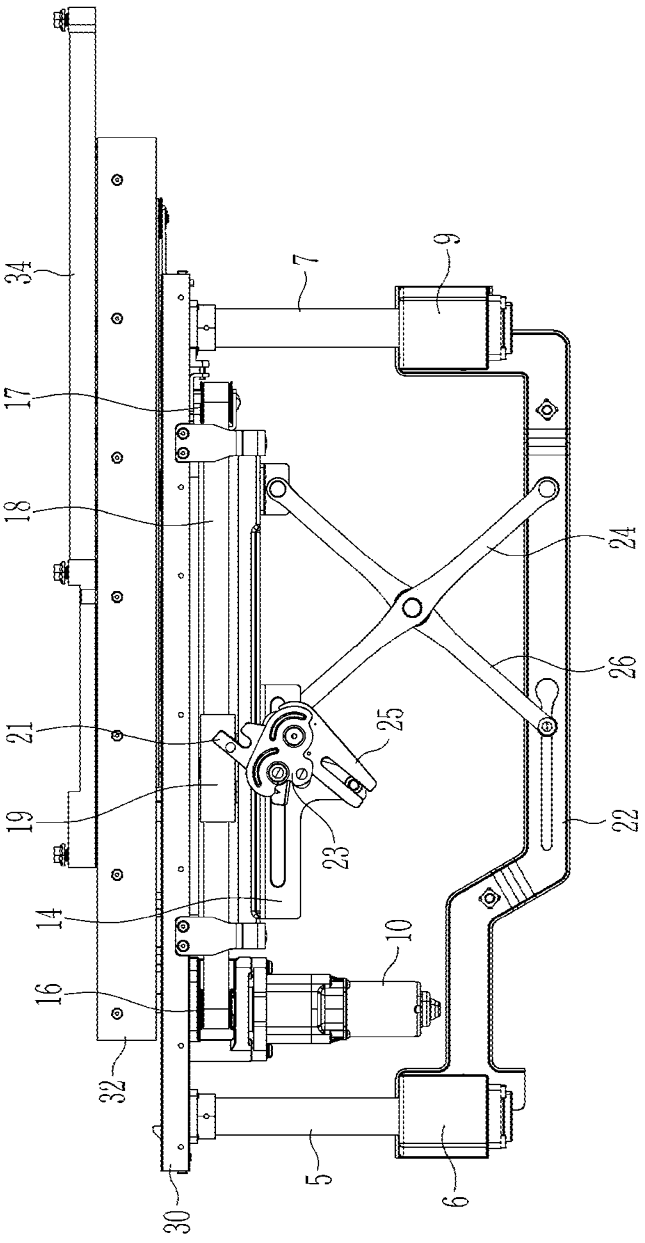
FIG. 13 is a diagram showing a sliding operation state of a door open-close device for a vehicle according to an exemplary embodiment of the present disclosure.
Figure 14:
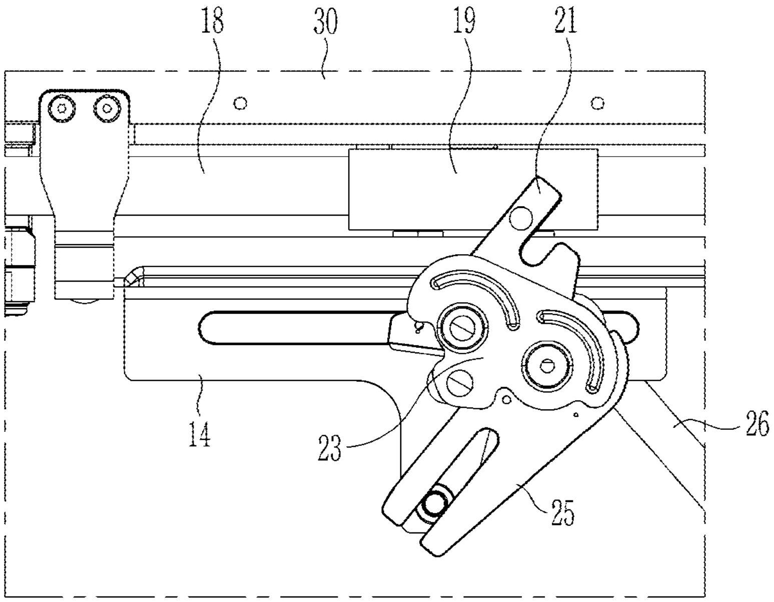
FIG. 14 is a diagram showing an operation state of a latch unit of the door open-close device for the vehicle of FIG. 13.

FIG. 13 is a diagram showing a sliding operation state of a door open-close device for a vehicle according to an exemplary embodiment of the present disclosure. FIG. 14 is a diagram showing an operation state of a latch unit of the door open-close device for the vehicle of FIG. 13.

Referring to FIGS. 13 and 14, as the belt carrier 19 continues to move, the first latch 21 further rotates, and the second latch 25 connected thereto further rotates and is decoupled from the second pop-up arm 26. Because the first latch 21 is fixed to the belt carrier 19, as the belt carrier 19 moves, the latch fixing unit 14 also moves, and one end portion of the first pop-up arm 24 moves. In the instant case, because one end portion of the second pop-up arm 26 is in a fixed state and the other end portion of the first pop-up arm 24 is also in the fixed state, the first pop-up arm 24 and the second pop-up arm 26 rotate in an opposite direction with centers connected and form a cross (X) shape to pop up the door 2.

Figure 15:
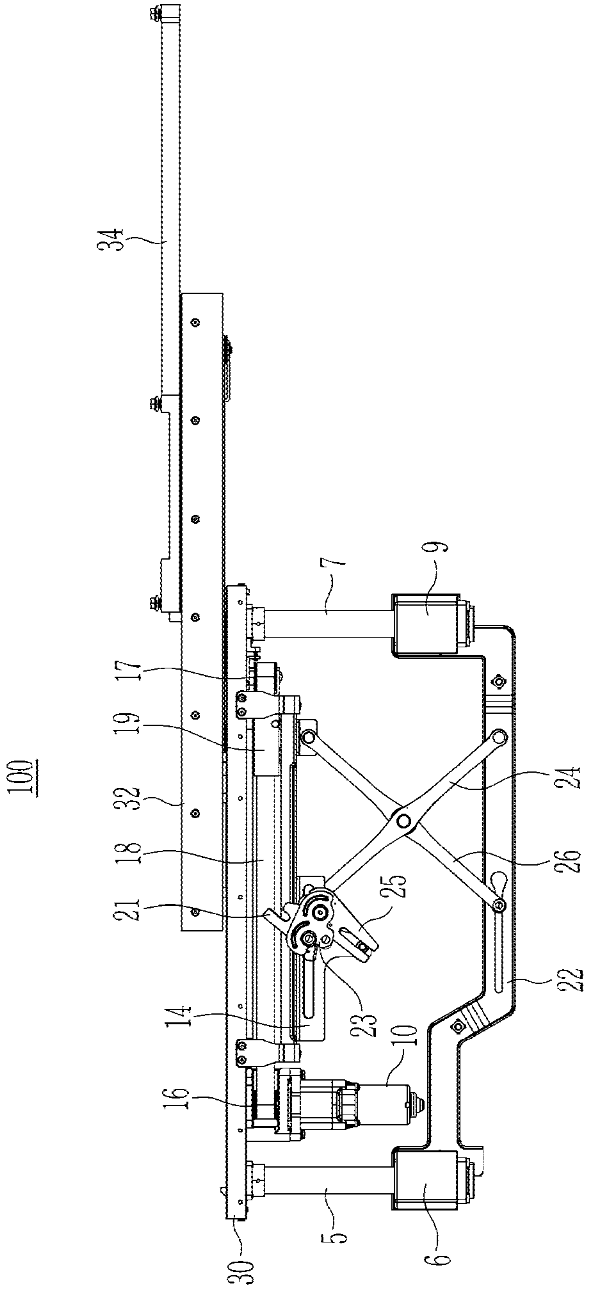
FIG. 15 is a diagram showing a sliding completion state of a door open-close device for a vehicle according to an exemplary embodiment of the present disclosure.
Figure 16:
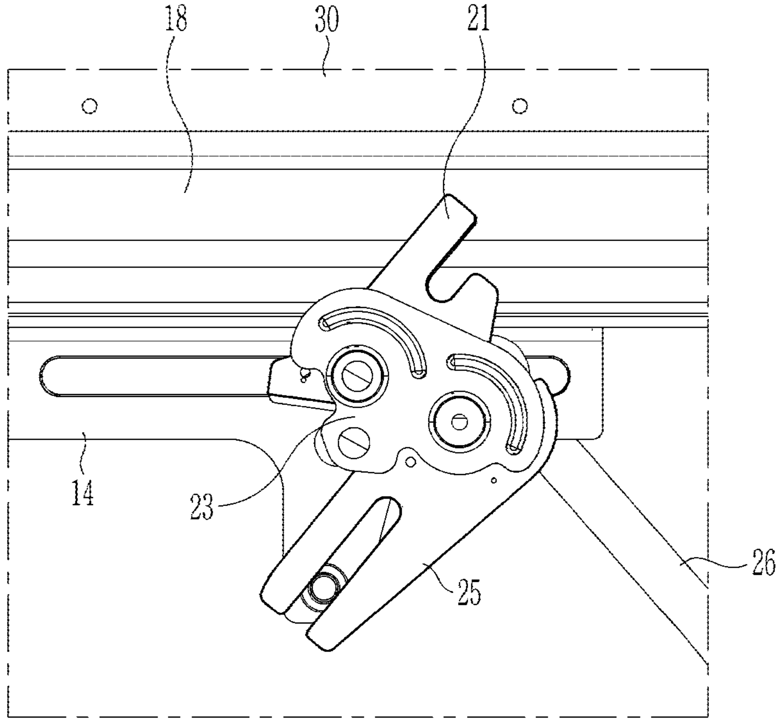
FIG. 16 is a diagram showing an operation state of a latch unit of the door open-close device for the vehicle of FIG. 15.

FIG. 15 is a diagram showing a sliding completion state of a door open-close device for a vehicle according to an exemplary embodiment of the present disclosure. FIG. 16 is a diagram showing an operation state of a latch unit of the door open-close device for the vehicle of FIG. 15.

Referring to FIG. 15 and FIG. 16, when the belt carrier 19 further moves, a locking groove 42 of the first latch 21 is decoupled from a latch lock 50 of the belt carrier 19 so that the belt carrier 19 continues to move, and the latch unit stops moving. In this regard, the door 2 is in a state in which a pop-up is completed. Also, the first latch 21 and the second latch 25 of the latch unit are coupled and fixed to each other. When the pop-up of the door 2 is completed, and the belt carrier 19 continues to move to reach an end portion of the first rail 30, a sliding movement of the door 2 is completed.

Figure 17:
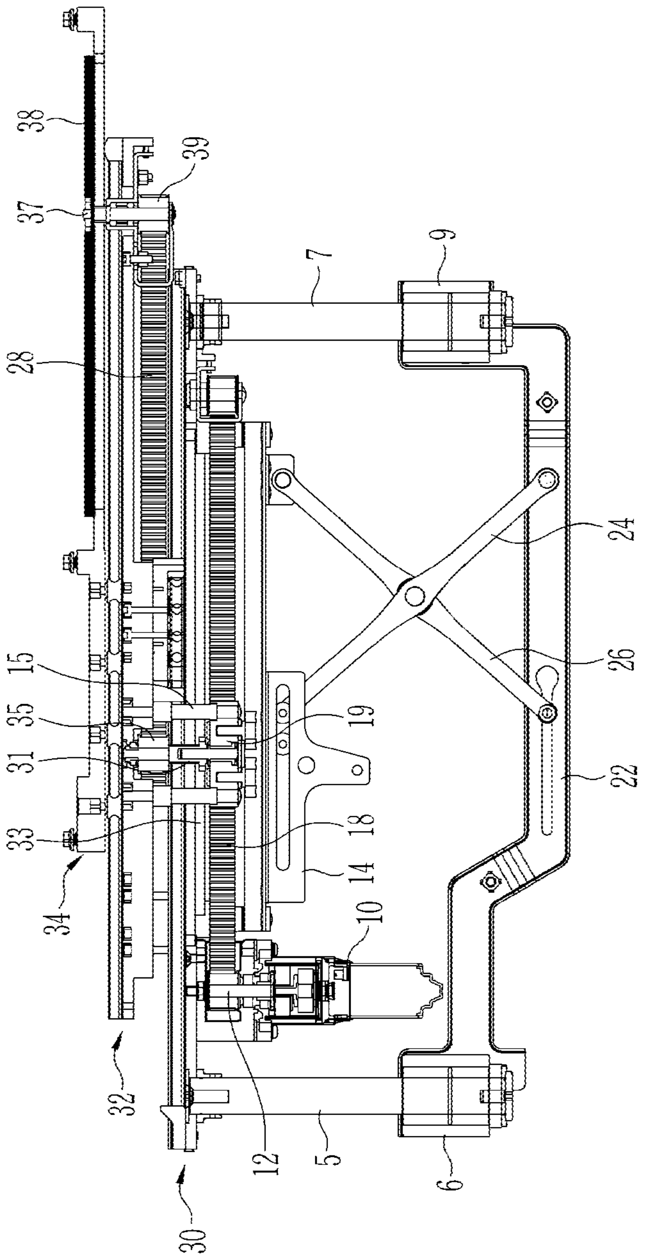
FIG. 17 is a front diagram showing cross sections of a pulley-belt unit and a rail unit of a door open-close device for a vehicle according to an exemplary embodiment of the present disclosure.
Figure 18:
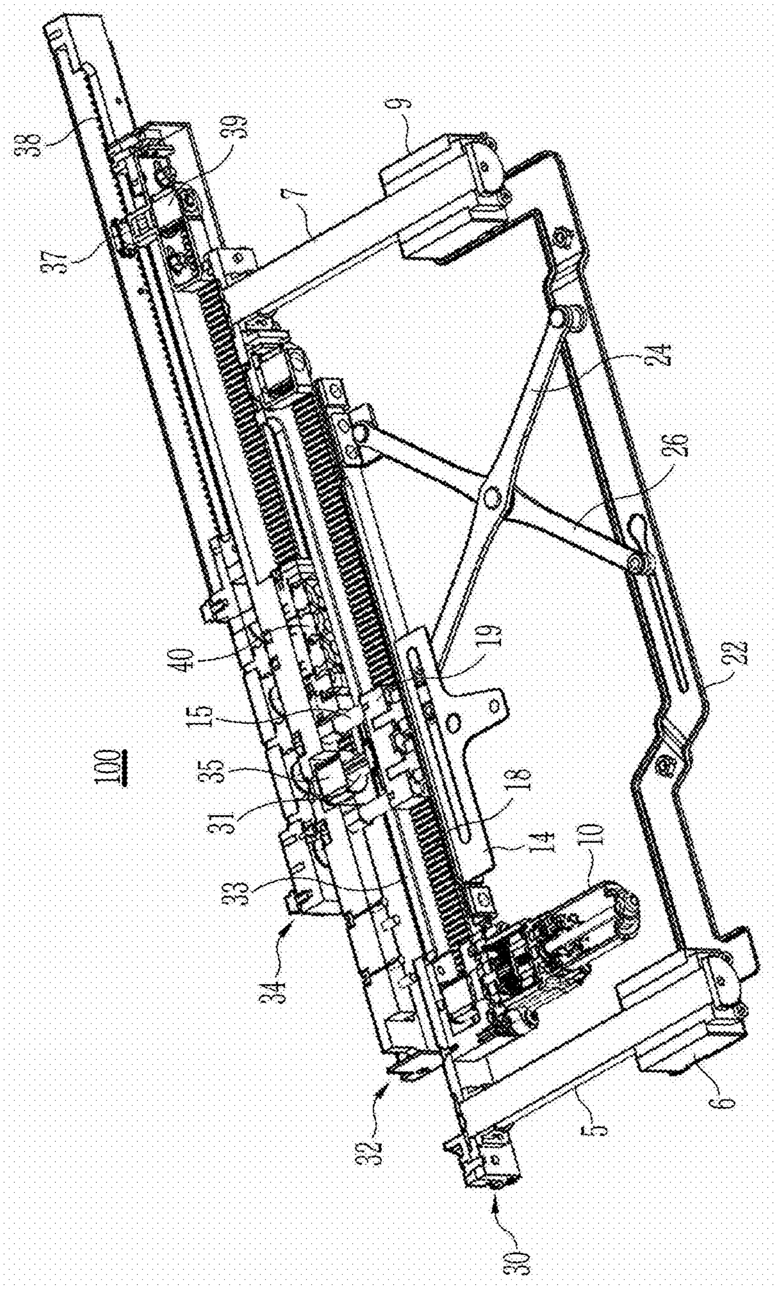
FIG. 18 is a perspective view showing cross sections of a pulley-belt unit and a rail unit of a door open-close device for a vehicle according to an exemplary embodiment of the present disclosure.
Figure 19:
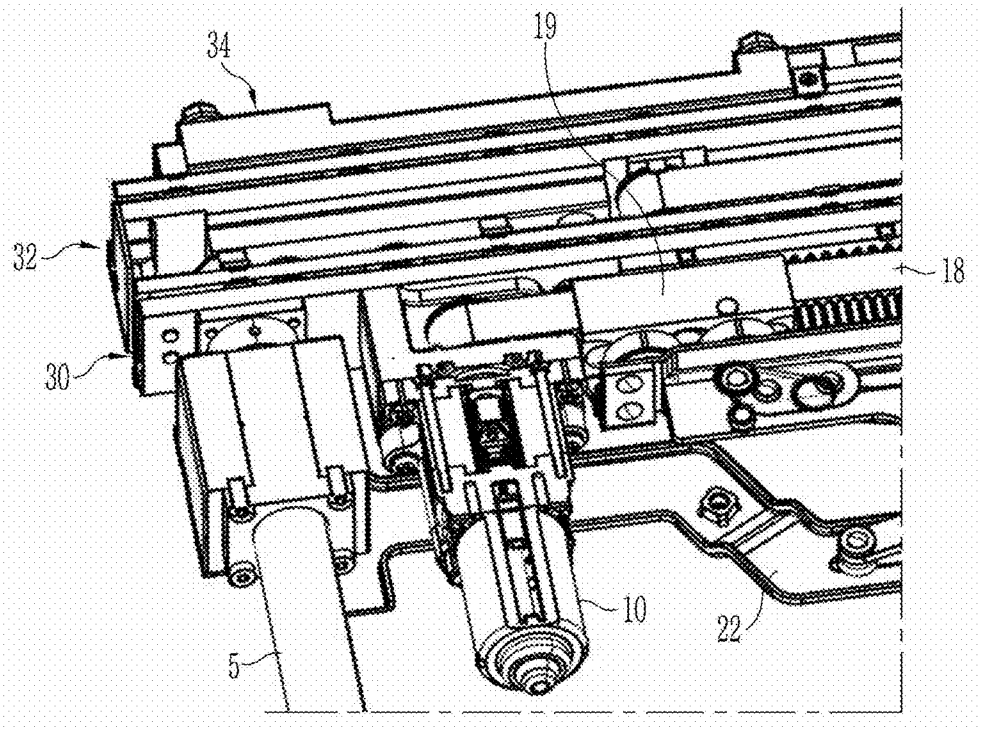
FIG. 19 is an enlarged view of a pulley-belt unit and a rail unit of a door open-close device for a vehicle according to an exemplary embodiment of the present disclosure.
Figure 20:
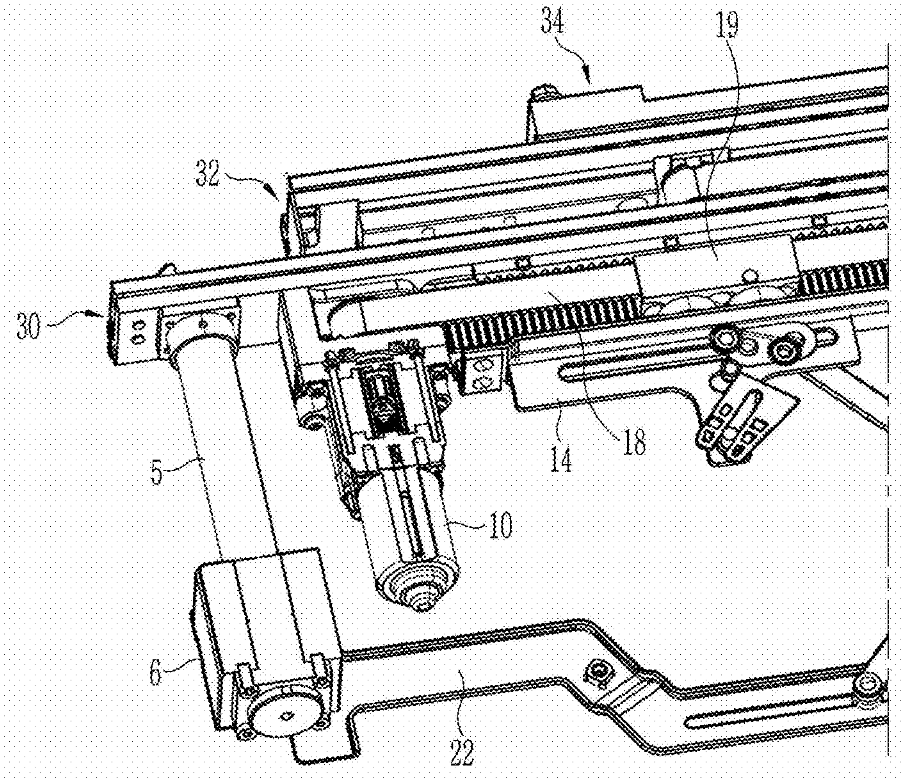
FIG. 20 is a diagram showing a state in which a second rail of a rail unit of a door open-close device for a vehicle slides and moves according to an exemplary embodiment of the present disclosure.
Figure 21:
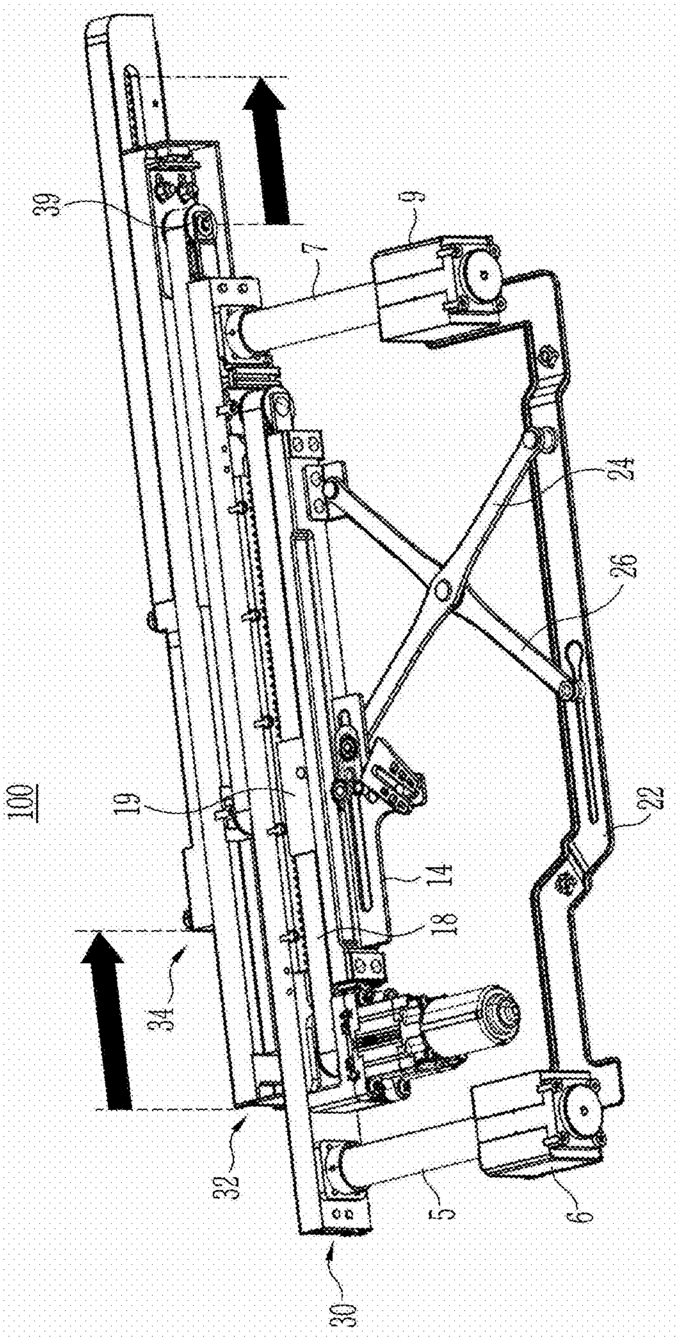
FIG. 21 is a diagram showing a state in which a third rail of a rail unit of a door open-close device for a vehicle slides and moves according to an exemplary embodiment of the present disclosure.

FIG. 17 is a front diagram showing cross sections of a pulley-belt unit and a rail unit of the door open-close device for the vehicle according to an exemplary embodiment of the present disclosure. FIG. 18 is a perspective view showing cross sections of the pulley-belt unit and the rail unit of the door open-close device for the vehicle according to an exemplary embodiment of the present disclosure. FIG. 19 is an enlarged view of the pulley-belt unit and the rail unit of the door open-close device for the vehicle according to an exemplary embodiment of the present disclosure. FIG. 20 is a diagram showing a state in which a second rail of the rail unit of the door open-close device for the vehicle slides and moves according to an exemplary embodiment of the present disclosure. FIG. 21 is a diagram showing a state in which a third rail of the rail unit of the door open-close device for the vehicle slides and moves according to an exemplary embodiment of the present disclosure.

Referring to FIGS. 17 to 21, the belt carrier 19 is provided on the belt 18 connecting the first pulley 16 and the second pulley 17, and a first pinion gear 31 is provided to penetrate the first rail 30 and is formed in a central portion of the belt carrier 19. A first rack gear 33 extending in a longitudinal direction of the first rail 30 is formed on a lower surface of the first rail 30, and the first pinion gear 31 of the belt carrier 19 is engaged with the first rack gear 33 and moves.

The belt carrier 19 is provided to penetrate the first rail 30 and extends so that a coupling pin 15 coupled to a lower portion of the second rail 32 is formed. Accordingly, as the belt carrier 19 is engaged with the first rack gear 33 and moves in the longitudinal direction of the first rail 30, the second rail 32 fixed to the coupling pin 15 slides and moves.

Pulleys 35 and 39 include the third pulley 35 provided at the lower portion of the second rail 32, and the fourth pulley 39 connected to rotate on the opposite side of the lower portion of the second rail 32 spaced apart from the third pulley 35. The third pulley 35 and fourth pulley 39 may be connected to a belt 28 that moves linearly by rotation of the third pulley 35 and the fourth pulley 39.

As the belt carrier 19 moves, the second rail 32 moves, and the third pulley 35 and the fourth pulley 39 provided on the second rail 32 rotate. Accordingly, the belt 28 connected to the third pulley 35 and the fourth pulley 39 moves linearly.

Meanwhile, a second pinion gear 37 penetrating the third rail 34 is coaxially provided in the fourth pulley 39, and is engaged with a second rack gear 38 formed in the third rail 34. Therefore, when the fourth pulley 39 rotates, the second pinion gear 37 is engaged with the second rack gear 38 of the third rail 34, and the third rail 34 slides and moves.

The sliding movement of the second rail 32 and the third rail 34 may be smoothly performed by a plurality of roller bearings 40. That is, the second rail 32 may slide and move in the longitudinal direction of the first rail 30 by rolling of the roller bearings 40 provided on the second rail 32, and the third rail 34 may slide and move in the longitudinal direction of the second rail 32 by rolling of the roller bearings 40 provided on the third rail 34.

Meanwhile, an opening process by pop-up and sliding and movement of the door 2 while the door 2 is closed has been described above, but on the other hand, a closing process by sliding and moving the door 2 and releasing the pop-up of the door 2 while the door 2 is open may be performed in the reverse order of the above description.

As described above, according to an exemplary embodiment of the present disclosure, a center rail/door arm structure is removed from a counter sliding door structure of a vehicle without a B-pillar, and thus, a door opening width may be maximized.

Furthermore, an upper rail/door arm structure in which sliding and moving and pop-up operations of a door are implemented is introduced, and thus, a door rotation radius is minimized, minimizing an amount of protrusion toward the outside of a vehicle body of the door when the door is opened.

Furthermore, a rail unit with a 3-stage telescopic structure is applied, and thus, openness and robustness may be simultaneously secured.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "up", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A door open-close apparatus configured to open or close a door opening portion of a vehicle by sliding and moving and popping up a door formed in a vehicle body, the door open-close apparatus comprising:
a driving unit configured to provide a driving force for sliding and pop-up operations of the door;
a latch assembly configured to receive the driving force from the driving unit and cause the door to pop up;
a pulley-belt unit engaged to the driving unit and configured to receive the driving force from the driving unit and allow the door to slide and move; and
a rail unit engaged to the pulley-belt unit and connected to the door and configured to provide a path for the door to slide and move by operation of the pulley-belt unit.

2. The door open-close apparatus of claim 1, wherein the driving unit includes:
a driving motor; and
a motor shaft provided at a center of the driving motor, engaged to the pulley-belt unit, and rotating by a rotation force of the driving motor.

3. The door open-close apparatus of claim 2, wherein the latch assembly includes:
a latch unit provided at a lower portion of the rail unit, configured to move in a longitudinal direction of the rail unit, and cause the door to slide and move or pop up; and
a pop-up unit provided at the lower portion of the rail unit, and configured to cause the door to pop up or be released from the pop-up according to an operation of the latch unit.

4. The door open-close apparatus of claim 3, further including:
a belt carrier including a latch lock, and
wherein the latch unit includes latches configured to rotate to be coupled to or decoupled from the latch lock provided in the belt carrier moving linearly along the rail unit by driving of the driving unit at the lower portion of the rail unit to switch pop-up and sliding operations of the door.

5. The door open-close apparatus of claim 4, wherein the latches include:
a latch fixing unit provided to move linearly at the lower portion of the rail;
a first latch pivotally coupled to the latch fixing unit and configured to rotate to be directly coupled to or decoupled from the latch lock provided in the belt carrier;
a second latch pivotally coupled to the latch fixing unit and coupled to the first latch to rotate together; and
a latch connection unit coupling the first latch to the second latch.

6. The door open-close apparatus of claim 5, wherein the pop-up unit includes:
guide bars connected to lower portions of first and second sides of the rail unit and configured to guide a pop-up path of the door;
fixing brackets fixed to the vehicle body and into which the guide bars are inserted;
a bracket connection bar connecting the fixing brackets to each other;
a first pop-up arm including a first end portion rotatably connected to the latch fixing unit, and a second end portion rotatably connected to the bracket connection bar; and
a second pop-up arm including a first end portion fixed on the lower portion of the rail unit, and a second end portion rotatably connected to the bracket connection bar,
wherein the second pop-up arm is rotatably connected to the first pop-up arm to have a cross shape at a center portion of the second pop-up arm.

7. The door open-close apparatus of claim 6,
wherein the first end portion of the first pop-up arm is slidably connected to the latch fixing unit, and the second end portion of the first pop-up arm pivotally connected to the bracket connection bar, and
wherein the first end portion of the second pop-up arm is pivotally on the lower portion of the rail unit, and the second end portion of the second pop-up arm is slidably connected to the bracket connection bar.

8. The door open-close apparatus of claim 7, wherein as the belt carrier moves, the second latch is selectively coupled to the second pop-up arm.

9. The door open-close apparatus of claim 2,
wherein the rail unit includes a plurality of rails telescopically connected to each other, and
wherein one of the plurality of rails is connected to the driving unit.

10. The door open-close apparatus of claim 9, wherein the plurality of rails includes:
a first rail connected to the driving unit;
a second rail connected to the first rail and configured to slide and move along the first rail; and
a third rail connected to the second rail and configured to slide and move along the second rail.

11. The door open-close apparatus of claim 10,
wherein the second rail is configured to slide and move in a longitudinal direction of the first rail by rolling of roller bearings provided on the second rail, and
wherein the third rail is configured to slide and move in a longitudinal direction of the second rail by rolling of roller bearings provided on the third rail.

12. The door open-close apparatus of claim 10, wherein the pulley-belt unit includes:
pulleys provided on a lower portion of the first rail and configured to receive the driving force from the driving unit and rotate; and
a belt coupled to the pulleys and configured to move linearly by rotation of the pulleys.

13. The door open-close apparatus of claim 12, wherein the pulleys include:
a first pulley connected to the motor shaft and connected to rotate at the lower portion of the first rail; and
a second pulley connected to rotate on an opposite side to the lower portion of the first rail spaced apart from the first pulley.

14. The door open-close apparatus of claim 13,
wherein the belt incudes a first belt, and
wherein the first pulley and the second pulley are connected to the first belt configured to move linearly by rotation of the first pulley and the second pulley.

15. The door open-close apparatus of claim 13, wherein the belt carrier includes a first pinion gear engaged with a first rack gear extending in a longitudinal direction and formed on a lower surface of the first rail and configured to move.

16. The door open-close apparatus of claim 15, wherein the belt carrier is connected to a lower portion of the second rail by a coupling pin.

17. The door open-close apparatus of claim 16, wherein the pulleys further include:

a third pulley provided at the lower portion of the second rail and connected to the first pinion gear; and a fourth pulley connected to rotate on an opposite side of the lower portion of the second rail spaced apart from the third pulley.

18. The door open-close apparatus of claim 17, wherein the belt incudes a second belt, and wherein the third pulley and fourth pulley are connected to the second belt configured to move linearly by rotation of the third pulley and the fourth pulley.

19. The door open-close apparatus of claim 18, wherein the fourth pulley includes a second pinion gear engaged with a second rack gear extending and formed in a longitudinal direction of the third rail, and configured to rotate to move the third rail in the longitudinal direction in response that the fourth pulley rotates.

* * * * *